July 25, 1967
J. JORDANS
3,332,270
ROLL CHANGE MEANS PREFERABLY FOR WELDING ROLL
MILLS FOR STRAIGHT BEAD WELDED TUBES
Filed Nov. 3, 1964
3 Sheets-Sheet 1
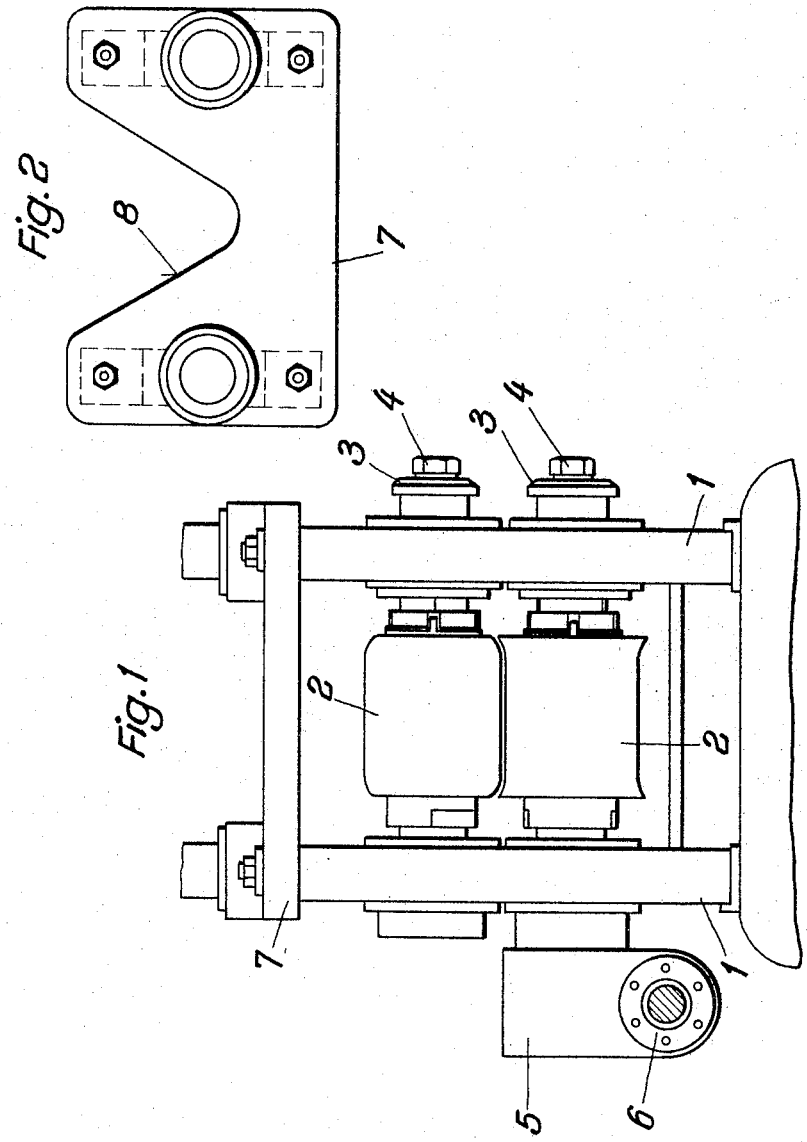
Inventor:
Josef Jordans,
By his Attorney.

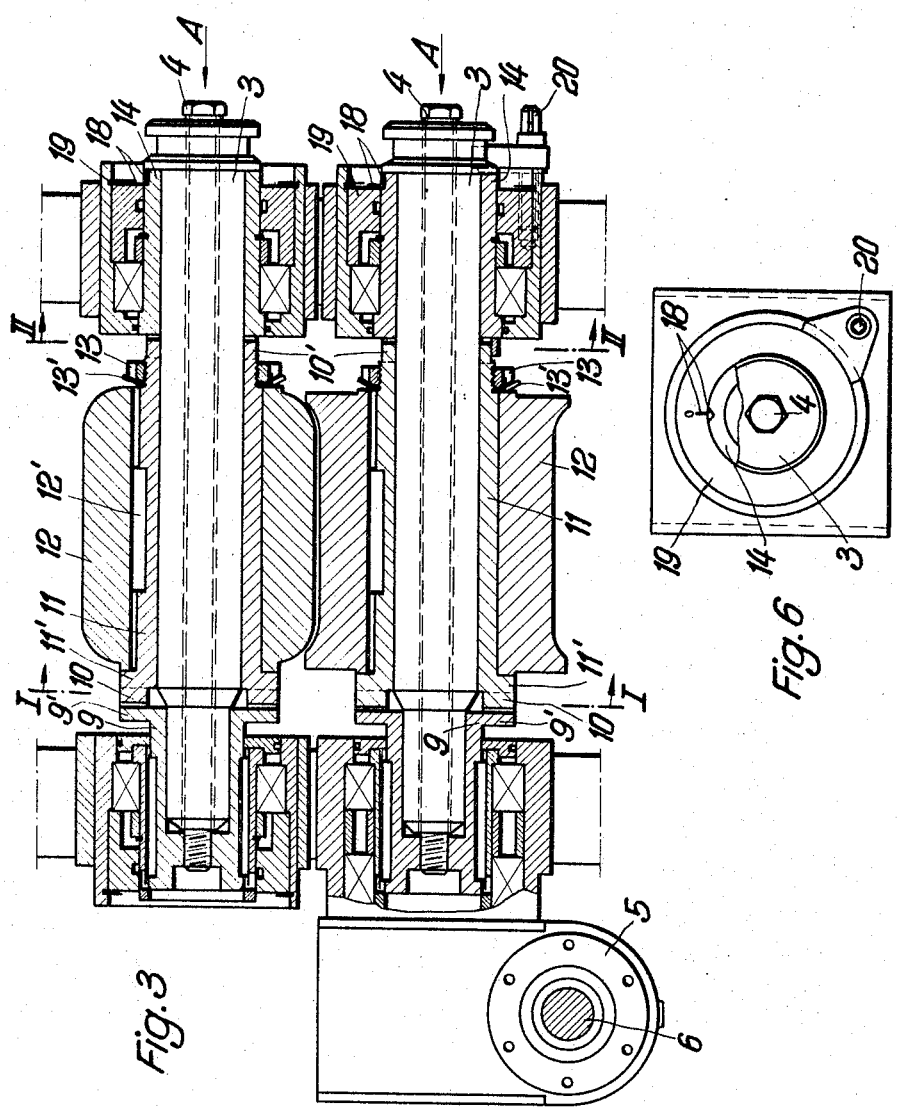

INVENTOR:
JOSEF JORDANS,
BY
HIS ATTORNEY

United States Patent Office 3,332,270
Patented July 25, 1967

3,332,270
ROLL CHANGE MEANS PREFERABLY FOR WELDING ROLL MILLS FOR STRAIGHT BEAD WELDED TUBES
Josef Jordans, Kleinenbroich, Germany, assignor to Mannesmann-Meer Aktiengesellschaft, Monchen-Gladbach, Germany, a corporation of Germany
Filed Nov. 3, 1964, Ser. No. 408,620
Claims priority, application Germany, Nov. 4, 1963, M 58,773
5 Claims. (Cl. 72—238)

The invention relates to rolling mills, and relates more particularly to roll frames for such rolling mills; and relates still more particularly to the releasable journalling and driving of rolls in such roll frames. The instant invention is particularly applicable for welding roll mill plants for straight bead welded tubes, and will in the following be explained in connection with such a welding roll mill plant, though it will be understood that the invention is not necessarily restricted to such specific plants.

The efficiency of a welding roll mill plant for straight bead welded tubes is greatly affected by the length of periods needed in changing the rolls.

It is accordingly among the principal objects of the invention to provide a roll mill in which only minimal time is required for roll changing.

So-called change frames have been proposed in the past towards accomplishment of the aforesaid aim, but it required to keep on hand expensive reserve frames, the costs of which were sufficiently large so that the over-all economy of this proposal was not favorable.

It has furthermore been proposed to pre-fabricate so-called structural units that were obtained by screw connections between mounting members and spacers therebetween, with the rolls supported in the mounting members, but the advantages obtained theerby were off-set by the difficulty in handling the heavy structural units during their insertion.

Other proposals were made, to shorten the roll change time, but these either depended too much on the skill of the men accomplishing this difficult labor, and involved additional costs; or used for the rolls engaging clutches which, for exchange, needed to be moved laterally, thereby requiring the support of the roll during the uncoupling of the roll prior to its removal for exchange, as otherwise the roll would due to gravity be liable to fall and be damaged.

It is accordingly another among the main objects of the invention to provide a roll frame for speedy roll exchange, that avoids the aforesaid drawbacks of the prior art.

It is another object of the invention to provide a roll frame, the roll of which is coupled by cogging that permits in one predetermined station of roll rotation to withdraw the roll radially, for example upwardly, yet supporting the roll free from any hazard of falling, at all times including the time before the roll is actually withdrawn, such as lifted, off its position in the roll frame.

It is still another object of the invention to provide a clutch of the aforesaid type, which includes interengaging cogging that includes radially outwardly tapered wedges and corresponding grooves between on one hand the parts that are permanently connected with the roll and exchangeable therewith, and on the other hand the parts that are in driving or in driven connection with the roll.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, one embodiment of the same being illustrated in the accompanying drawings and described in the specification.

With reference to the enclosed drawings one embodiment of the invention will be explained in exemplified form.

In the drawings:

FIGURE 1 is a view in roll direction of the frame with installed rolls and drive means of the lower roll.

FIGURE 2 is a plan view of the frame cover.

FIGURE 3 is a vertical section transverse to the roll direction through the bearing and the rolls.

FIGURE 6 is a view in the direction of arrows 6—6 of FIGURE 3 with the assembly respectively dismantling marks.

Figure 3A:
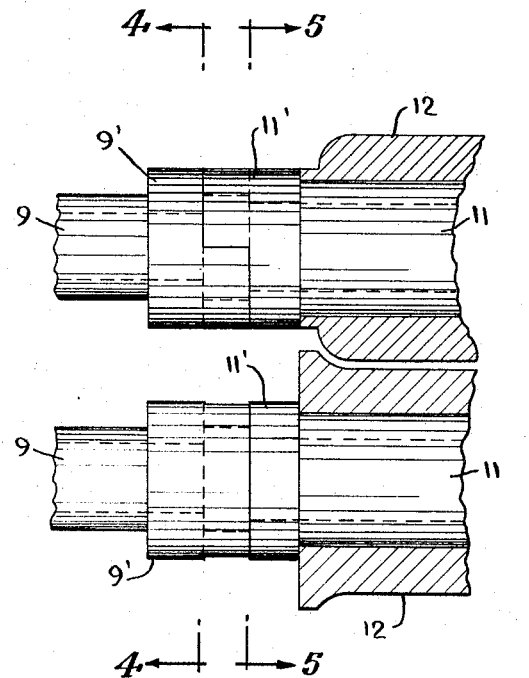
FIGURE 3a is a fragmentary elevational view, partly in section, showing portions of FIGURE 3.

The roll frames 1 according to FIGURE 1 show the installed roll screw units 2 with insertion shafts 3 and screw bolts 4, and the drive is provided e.g. only for the lower roll through a gear 5 of known type by a continuous shaft 6. The frames 1 are maintained in their position by the frame cover 7, said frame cover 7 according to FIGURE 2 being provided with a special recess 8 whereby is obtained a simple means for lifting the roll screw units 2 in vertical direction.

The drive is transferred from the gear 5 to the transfer sleeve 9 terminating in the direction of the roll center in a reinforced collar 9′ in engagement in a special cogging 10 in a reinforced collar 11′ of the roll bushing 11 of the roll 12. The roll bushing 11 and roll 12 form by means of the wedge 12′ a rotational unit. The parts 11 and 12 are united by means of a nut 13 and a safety device 13′ into a screw unit 2. At the side of the nut 13 terminates the roll bushing 11 also in a cogging 10′ of same type and is in engagement with a transfer sleeve 14 supported in the right frame. The transfer sleeve 9, roll screw unit 2 and transfer sleeve 14 are clamped through a hollow insertion shaft 3 by means of screw bolts 4 and thus form a unit laterally adjustable (FIGURE 3) by means of the adjusting screw 20.

The upper roll screw unit 2 shows the same features as the lower roll screw unit with the exception that the same is not driven. The cogging according to the invention is shown in detail in the FIGURES 3a, 4 and 5, so that the novel bearing of the roll screw unit 2 in the transfer sleeves 9 and 14 is clearly shown, and this type of bearing simultaneously also serves as power transfer means as the output shaft of gear 5.

This novel bearing for the roll screw units 2 is rendered possible according to the present invention by respective recesses and shoulder formations at the transfer and roll sleeve front surfaces resulting in a type of cogging which will be described in detail hereinbelow. Upon assembly or dismantling of the roll screw units 2 a centered mounting and depositing respectively lifting is possible without any insertion shafts 3.

Figure 4:
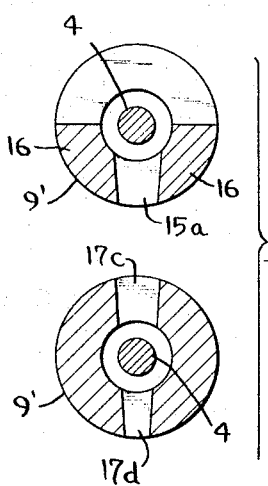
FIGURE 4 is a vertical section according to line 4—4 of FIGURE 3a transverse to the insertion shafts.
Figure 5:
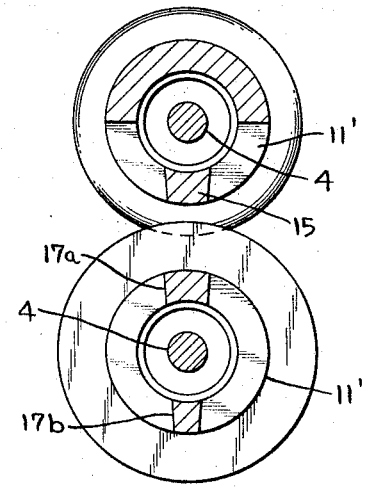
FIGURE 5 is a vertical section according to line 5—5 of FIGURE 3a transverse to the insertion shafts.

In FIGURES 3a and 5 with respect to the upper roll bearing it will be recognized that the front surface of the collar 11′ of the roll bushing 11 is recessed in its longitudinal direction below the horizontal center axis in such a manner that there remains an annular shoulder 15 tapering in radially outward direction, however, the front surface of the bushing 9' of the transfer sleeve 9 changes in its longitudinal direction in such a manner that above the horizontal central axis there is removed a semi-circular ring. This ring has surfaces as support means for the respective receiving means of bushing 11; and below the horizontal central axis there is milled a recess 15a (FIGURE 4) tapering in radially outward direction, so that there only remain the shoulders 16. This completes the cogging of the upper roll bearing.

The cogging of the roll bearing of FIGURES 3a, 4 and 5 is, however, of such form that here at the collar 11' of the roll bushing 11 in radial direction there remain wedge type annular shoulders 17a and 17b, whereas the collar 9' of the transfer sleeve 9 is provided with the respective recesses 17c and 17d. By this arrangement there is ensured a precise centering and secondly upon lifting of the roll screw unit 2 no interference occurs upon passage through the recess 15a of the upper transfer sleeve.

By this special type of a cogging of roll bushings and transfer sleeves firstly as bearing and centering means for the rolls and secondly as power transfer means it has been achieved that the assembly and dismantling of the roll screw units is so simplified, that upon the removal of the screw bolts 4 and the insertion shaft 3 the roll screw units can now be directly lifted in upward direction from the plant.

It is only to be noted that the dismantling marks 18 in FIGURE 6 are arranged precisely opposite the O-mark on the cover 19 to indicate the predetermined station at which the screw unit 2 is unobstructed to be lifted off radially, for instance vertically, after the shaft 3 has been withdrawn.

The dismantling of the roll screw units 2 is effected according to the present invention in the following manner:

After the loosening of the screw bolts 4 the same can be withdrawn together with the insertion shafts 3 comparatively easily with means known per se in lateral direction so far that the separation point of the roll bushing 11 and transfer sleeve 14 is free, while the insertion shafts 3 with their greater diameter still remain a portion in their bearing of the transfer sleeve 14 and are there maintained in horizontal position. Now the dismantling marks 18 on the exterior front surface of the transfer sleeves 9 and 14 are adjusted into a superposing relationship with the O-mark on the closure cover 19 by rotating the rolls, so that recesses and shoulders of the bearings are directed with their tapering ends in vertical upward direction.

Thereby the lifting of the roll screw units with a crane or other lifting means in vertically upward direction can be easily effected. It is particularly advantageous that one need not wait for a lifting means, so that screw bolts and insertion shafts of all frames can be removed in sequential order. The assembly of the rolls is effected in inverse sequence, and here the new rolls are already prepared in a different screw unit, so that a very substantial saving in time can be achieved by the invention.

What I claim is:

1. In a roll frame, particularly for use in rolling straight bead welded tubes, two frame supports, roll support means operable to receive and to transmit driving energy and for supporting exchangeably rolls on said frame supports, the roll support means for each roll comprising a roll bushing, a roll connected to said bushing for tied rotation therewith, an insertion shaft for said roll normally emplaced on said frame parts, said roll bushing in the normal shaft position surrounding said shaft, the shaft for each roll normally being emplaced on said frame parts in the normal position and, respectively, being at least partially retractable to a retracted position, each shaft in the normal position supporting its bushing and roll including during the rolling operation and, respectively, in the retracted position releasing said bushing and roll for removal, a sleeve near each shaft end portion disposed in each frame support, each of the opposite end faces of each bushing normally being positioned adjacent a face of a sleeve, and cogging between the respective bushing and sleeve faces comprising cogging elements engageable and disengageable solely radially in a predetermined station of rotation of said bushing.

2. In a roll frame, particularly for use in rolling straight bead welded tubes, two frame supports, roll support means operable to receive and to transmit driving energy and for supporting exchangeably rolls on said frame supports, the roll support means for each roll comprising a roll bushing, a roll connected to said bushing for tied rotation therewith, an insertion shaft for said roll normally emplaced on said frame parts, said roll bushing in the normal shaft position surrounding said shaft, the shaft for each roll normally being emplaced on said frame parts in the normal position and, respectively, being at least partially retractable to a retracted position, each shaft in the normal position supporting its bushing and roll including during the rolling operation and, respectively, in the retracted position releasing said bushing and roll for removal, a sleeve near each shaft end portion disposed in each frame support, each of the opposite end faces of each bushing normally being positioned adjacent a face of a sleeve, and cogging between the respective bushing and sleeve faces comprising cogging elements formed between the faces engageable and disengageable solely radially in a predetermined station of rotation of said bushing, and normally held in engagement when said shaft is emplaced in the normal position and, respectively, being disengageable only when said shaft is in the retracted position.

3. In a roll frame, particularly for use in rolling straight bead welded tubes, two frame supports, roll support means operable to receive and to transmit driving energy and for supporting exchangeably rolls on said frame supports, the roll support means for each roll comprising a roll bushing, a roll connected to said bushing for tied rotation therewith, an insertion shaft for said roll normally emplaced on said frame parts, said roll bushing in the normal shaft position surrounding said shaft, the shaft for each roll normally being emplaced on said frame parts in the normal position and, respectively, being at least partially retractable to a retracted position, each shaft in the normal position supporting its bushing and roll including during the rolling operation and, respectively, in the retracted position releasing said bushing and roll for removal, a sleeve near each shaft end portion disposed in each frame support, each of the opposite end faces of each bushing normally being positioned adjacent a face of a sleeve, and cogging disposed between the respective bushing and sleeve faces comprising a first part formed on the sleeve face including a support means and a cogging part and a second part formed on the respective bushing face having receiving means engaging said support means in all positions of rotation of said roll and a cogging part engaging the cogging part of said sleeve, said support means engaging said receiving means from below and said cogging including its part clearing the removal path of said roll sufficiently, for the direct substantially upward lifting of the roll off its normal position in a predetermined station of rotation of said bushing, when said shaft is retracted to the retracted position, whereby in the normal position torque will be transmitted between the respective sleeves and bushing when the shaft is emplaced and, respectively, in said predetermined station the roll may be lifted directly off substantially upwardly.

4. In a roll frame, as claimed in claim 3, said support and receiving means comprising corresponding cut-outs defined on each bushing and its sleeves along corresponding substantially diametrical surfaces and along surfaces at right angles thereto, the cogging comprising a radially outwardly tapered wedge on one face and a corresponding groove on the face adjacent thereto, said taper being radially substantially downwardly directed in said predetermined station.

5. In a roll frame, as claimed in claim 1, and marking means connected with relation to a frame and to a part rotating with a bushing, respectively, operable for indicating said predetermined station.

References Cited

UNITED STATES PATENTS

| | | | |
|---|---|---|---|
| 10,478 | 1/1854 | McCarty | 72—247 |
| 2,467,071 | 4/1949 | Abbey | 72—247 |

FOREIGN PATENTS 1,140,535  12/1962  Germany.

CHARLES W. LANHAM, *Primary Examiner.*

H. D. HOINKES, *Assistant Examiner.*